(12) United States Patent
Pilu et al.

(45) Date of Patent: Dec. 8, 2015
(10) Patent No.: US 9,210,324 B2

(54) IMAGE PROCESSING (75) Inventors: Maurizio Pilu, Bristol (GB); Stephen Philip Cheatle, Bristol (GB)

(73) Assignee: Hewlett-Packard Development Company, L.P., Houston, TX (US)

(*) Notice: Subject to any disclaimer, the term of this patent is extended or adjusted under 35 U.S.C. 154(b) by 3114 days.

(21) Appl. No.: 11/253,993

(22) Filed: Oct. 19, 2005

(65) Prior Publication Data
US 2006/0103731 A1    May 18, 2006

(30) Foreign Application Priority Data

Oct. 23, 2004   (GB) .................................. 0423598.2

(51) Int. Cl.
H04N 5/232    (2006.01)
H04N 1/387    (2006.01)
H04N 5/262    (2006.01)

(52) U.S. Cl.
CPC ......... *H04N 5/23293* (2013.01); *H04N 1/3873* (2013.01); *H04N 5/2628* (2013.01); *G06T 2207/20132* (2013.01)

(58) Field of Classification Search
USPC ...................................................... 348/208.3
See application file for complete search history.

(56) References Cited

U.S. PATENT DOCUMENTS 5,844,599 A * 12/1998 Hildin ........................ 348/14.1
6,262,769 B1 * 7/2001 Anderson et al. .......... 348/333.1
6,476,861 B1   11/2002 Min
6,806,906 B1   10/2004 Soga et al.
7,339,606 B2 *  3/2008 Fukuda et al. ............... 348/143
7,633,527 B2 * 12/2009 Pilu ............................ 348/211.4
2001/0012449 A1 *  8/2001 Kawabe et al. ............. 396/234
2001/0050720 A1 * 12/2001 Karube et al. ............... 348/373
2002/0171747 A1 * 11/2002 Niikawa et al. .......... 348/333.01
2004/0070675 A1 *  4/2004 Fredlund et al. ........... 348/208.1

FOREIGN PATENT DOCUMENTS

GB     2316255 A      2/1998
JP     2003241249 A   8/2003
JP     2003287784 A  10/2003

OTHER PUBLICATIONS

Examination Report, GB Application No. 0423598.2, Oct. 13, 2009, pp. 1-3.

* cited by examiner

Primary Examiner — Anthony J Daniels
(74) Attorney, Agent, or Firm — HP Legal Department (57) ABSTRACT

A method of processing image data representing a captured image, the data generated using an image capture element of an image capture device, the method comprising generating state data representing at least one characteristic of motion of the image capture device and a status of at least one setting of the device during a predetermined time period, and processing the image data on the basis of the state data in order to provide a measure of the accuracy of framing of the captured image within a field of view of the device, and corresponding apparatus.

38 Claims, 4 Drawing Sheets

IMAGE PROCESSING

FIELD OF THE INVENTION

The present invention relates to the field of image processing.

BACKGROUND

When taking pictures a user of an image capture device such as a camera for example may or may not put care into framing a subject of the image accurately. Hence, in some situations pictures are taken quickly and are generally referred to as 'snaps' or 'snapshots', whilst in others a long time can be spent carefully framing a subject in order to obtain a desired image composition.

Differences in picture taking behaviour can be the result of a combination of factors. For example, some camera users always take pictures very quickly, perhaps due to lack of training or through not wishing to spend a long time "behind the camera", whilst other users take time and trouble when the situation permits or a good result is critical, but on other occasions are forced to take a quick snap.

A further distinction in picture taking behaviour relates to the subject itself. In the case of moving objects, a photographer may wait for a desired moment to capture an image. Some examples include: a subject scoring a goal, eye-contact with the user, and the sun emerging from behind a cloud and so forth. In these situations, attention is more focused on capturing a desired moment in time, rather than ensuring that a subject of the captured image is well framed.

Current cameras do not recognize the picture taking behaviour of a user, other than by the direct operation of the camera controls. As such, the image processing functionality of the camera is generally determined only by its settings and the content of the captured image. This precludes the possibility of making image processing responsive to the way the camera is being used.

A particular problem with this rigid approach to image processing is that processing steps such as autocropping are either 'on' or 'off', as generally set by user choice —the term "autocropping" refers to algorithms which automatically generate one or more crops of a photographic image based on an algorithmic assessment of likely areas of interest, or salient areas, within a captured image. The autocrop location can be selected to include the areas of interest, remove distractions or large boring areas, and produce a pleasing composition for example.

A number of autocropping approaches are known. U.S. patent application Ser. No. U.S. Pat. No. 5,978,519 is an example. It assumes that the "background" region of a captured image has relatively low intensity variance compared with the foreground. A threshold is selected based on the variance of blocks, and a bounding box of the subject is then used for cropping.

A more recent approach may be found in United Kingdom Patent Application No. GB0031423.7 which uses a saliency map determined by region segmentation and colour 'unusualness' to identify both subject areas and distraction areas. Multiple crops are suggested based on alternative combinations of subjects, in each case excluding distractions and selecting locally optimal crop boundaries.

European Patent Application No. EP1158464A1 also uses a saliency map derived from region segmentation.

Some of the above algorithms can have hints or constraints applied by an external source (typically a person interacting with the algorithm). These provide the algorithm with guidance to ensure that some areas are always preserved, but do not provide an automatic determination of when autocropping may be appropriate.

STATEMENT OF THE INVENTION

According to a first aspect of the present invention there is provided a method of processing image data representing a captured image, the data generated using an image capture element of an image capture device, the method comprising generating state data representing at least one characteristic of motion of the image capture device and a status of at least one setting of the device during a predetermined time period, and processing the image data on the basis of the state data in order to provide a measure of the accuracy of framing of the captured image within a field of view of the device.

According to a second aspect of the present invention there is provided an image capture device comprising an image capture element operable to generate image data, a processor, and a state data generator for generating state data representing at least one characteristic of motion of the image capture device and a status of at least one setting of the device during a predetermined time period, wherein the processor is operable to process image data representing a captured image on the basis of the state data in order to provide a measure of the accuracy of framing of the captured image within a field of view of the device.

According to a third aspect of the present invention there is provided an image capture device comprising an image capture element operable to generate image data, a processor, and a state data generator for generating state data representing at least one characteristic of motion of the image capture device and a status of at least one setting of the device during a predetermined time period, the processor being operable to process image data representing a captured image on the basis of the state data in order to provide crop data representing a measure of the accuracy and/or type of framing of the captured image within a field of view of the device, the processor operable to use the crop data in order to determine a subset of the captured image data to delete from a memory of the device.

According to a fourth aspect of the present invention there is provided a computer program product for use with a computer, said computer program product comprising a computer useable medium having computer executable program code embodied thereon, wherein said product is operable, in association with said computer, to generate state data representing at least one characteristic of motion of an image capture device and a status of at least one setting of the device during a predetermined time period, and process image data on the basis of the state data in order to provide a measure of the accuracy of framing of the captured image within a field of view of the device.

According to a fifth aspect of the present invention there is provided a computer program, comprising machine readable instructions, wherein said program is arranged, in association with said machine, to generate state data representing at least one characteristic of motion of an image capture device and a status of at least one setting of the device during a predetermined time period, and process image data on the basis of the state data in order to provide a measure of the accuracy of framing of the captured image within a field of view of the device.

BRIEF DESCRIPTION OF THE FIGURES

For a better understanding of the present invention, and to further highlight the ways in which it may be brought into effect, various embodiments will now be described, by way of example only, with reference to the following drawings in which.

It should be emphasized that the term "comprises/comprising" when used in this specification specifies the presence of stated features, integers, steps or components but does not preclude the presence or addition of one or more other features, integers, steps, components or groups thereof.

DETAILED DESCRIPTION

Figure 1:
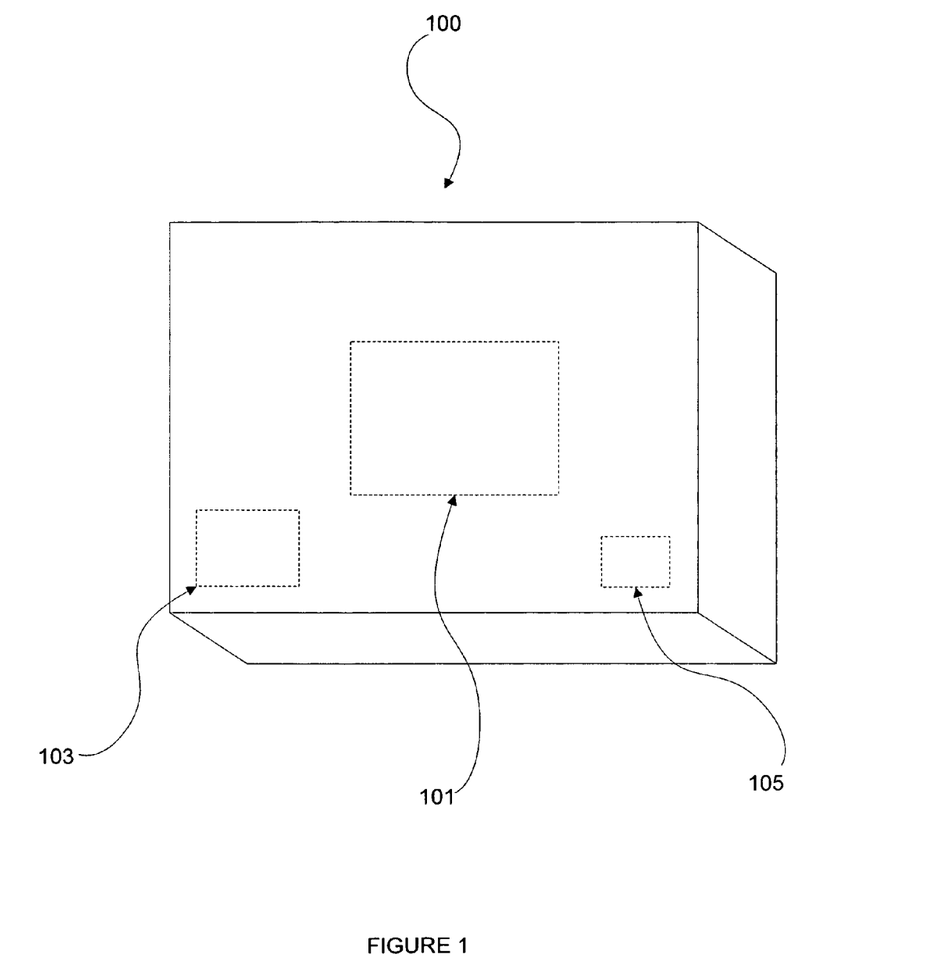
FIG. 1 is a schematic representation of a camera operable in accordance with an embodiment of the present method.

FIG. 1 is a schematic representation of an image capture device 100 suitable for use in an embodiment. Device 100 can be a digital still or video camera or a combination thereof, or any other suitable image capture device including a device comprising image capture functionality such as a mobile telephone or PDA for example. Broken lines in FIG. 1 indicate camera elements which are inside the camera body and therefore not normally visible to a user. The camera comprises an image capture element 101 such as a CCD or CMOS device, or any other suitable image capture element. The image capture element 101 is operable to generate image data representing an image of a scene or object.

Sensor 103 of camera 100 is operable to generate data representing a state of the camera substantially prior to generation of the image data. Preferably, this state data generated by the sensor 103 relates to use of the camera and can therefore include data representing position and/or orientation changes of the camera (camera movement, or movement patterns for example) and/or the condition of camera settings for example. According to a preferred embodiment, the state data is processed by a suitable processor 105 of the camera in order to provide data for use in interpreting the semantics of an image capture situation. This will be explained in further detail below.

The time frame over which changes in camera position/orientation/settings occur can be important factor in the interpretation. For example, when using generated state data to interpret the semantics of an image capture procedure, more or less weight may be given to certain actions and/or camera movements on the basis of the time frame over which they have occurred. So for example a slow steady movement of the camera 100 can indicate that a user is taking care to frame image, whereas an abrupt movement of the camera can indicate that the a captured image will not be well framed due to the lack of time that has been spent framing a subject of the image.

The interpretation can also comprise an analysis of data representing the motion of a subject in a scene of the image in question, and/or data representing the use of camera functions, such as a zoom function of the camera for example.

Inferring appropriate image constraints automatically from the behaviour of the camera user, and hence changes to a state or condition of the camera, prior to image capture obviates the need for a user to explicitly interact with an autocrop algorithm of the device. In particular, if processed state data indicates that a user has taken care to compose an image, an autocrop algorithm or similar image processing step of the camera 100 can be disabled.

In a preferred embodiment, data representing the operation of a camera during a preview period of an image capture operation is analysed by processor 105 in order to determine a probability of a type of framing of a captured image and the accuracy of the framing. More specifically, movement of an image capture device and the operation of the device controls, amongst other things, results in the generation of data which is used in order to infer or classify a framing type and accuracy thereof.

As mentioned above, a type of image framing—or more specifically, the way a subject or subjects of an image are framed within the field of view of a camera—can be characterised by a use model of the camera 100. So, for example, if the camera is used to take a quick snap, the image framing is likely to be less than optimal due to lack of care and/or time in capturing an image such that the image is not framed in a portion of the field of view of the camera 100 which was intended for example.

In this connection, sensor 103 can be any sensor suitable for generating data representing a position and/or orientation and/or setting of the camera 100, and/or changes thereof. For example, sensor 103 may be an accelerometer operable to generate data representing a movement of the camera 100 in any one or more of the degrees of freedom of the camera. Alternatively, sensor 103 may be a suitably programmed processor operable to determine the camera settings or a change therein and generate data representative thereof. Combinations of the above are possible, as are other suitable alternatives as will be appreciated by those skilled in the art. Camera 100 may include more than one sensor 103, however for the sake of clarity the present description will reference the use of one suitable sensor in a device.

The time period before image capture in which state data is generated by the sensor 103 can be characterised as a 'preview period', as it is the time when a user of a camera frames an image before capture thereof. Such data can continue to be generated after an image has been captured however, and can therefore also be used to provide any desired post-processing of image data.

Figure 2:
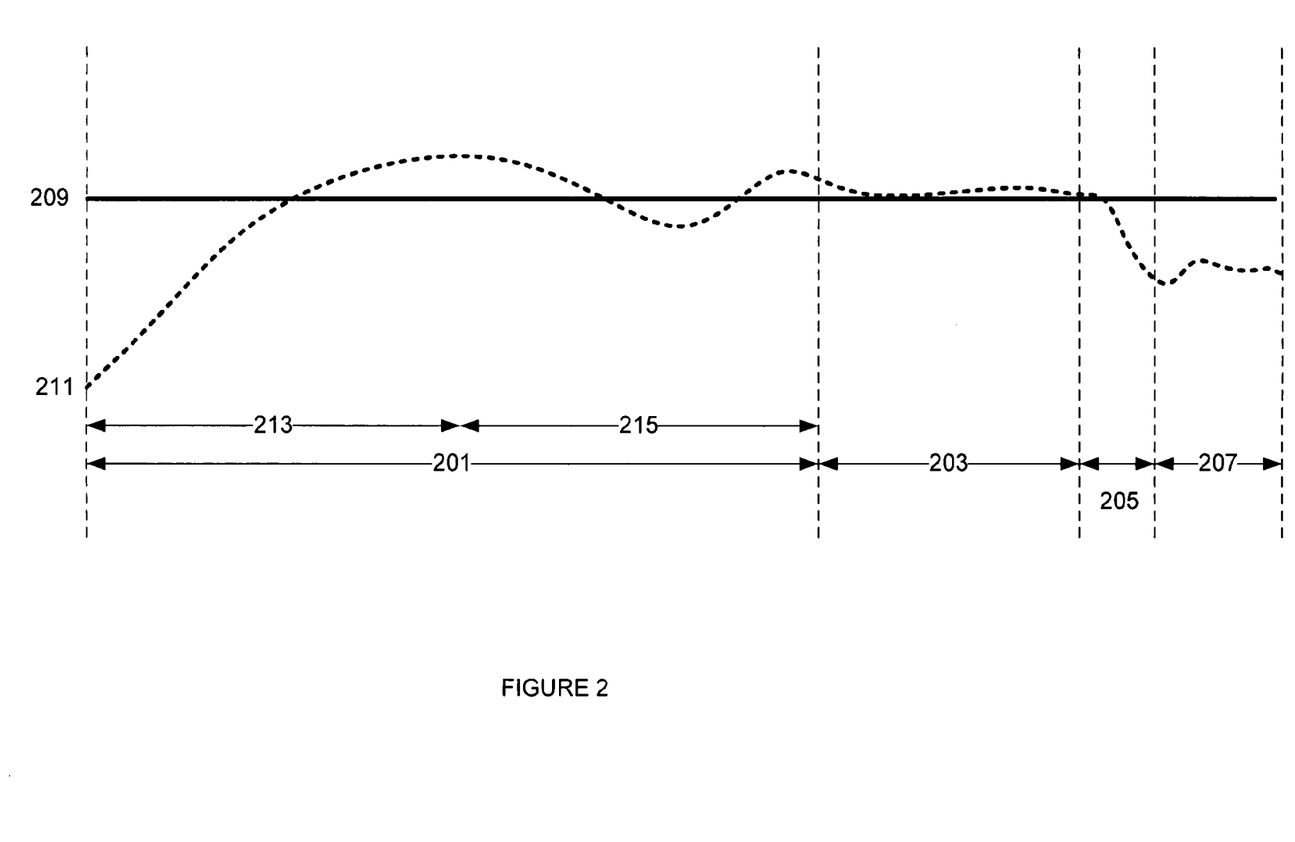
FIG. 2 is a schematic representation of exemplary stages of an image capture operation when using the camera of FIG. 1.

In this connection, FIG. 2 is a schematic representation of exemplary stages of a typical hand-held image capture process in one dimension. More or less stages may be present in an image capture operation.

In stage 201 which is generally referred to as the aiming stage, a camera user attempts to get the aim of the camera 100 progressively closer to the target of which an image is desired using a combination of ballistic and visually servoed adjustments of the camera for example, in order to place the desired subject of an image within a desired portion of the field of view of the camera 100.

In the second stage 203 the photographer attempts to steady the camera 100 using both visual servoing and muscle feedback for example. The third stage 205 is the moment when the photographer presses the shutter button (or similar) of the camera 100 in order to effect image capture. The fourth stage 207 is the exposure time where an image is captured by an image capture element 101 of the camera 100. If manual zoom and focus functions are present on the camera 100, these may also be used during the above stages. The relative sizes of the stages are not to scale in the figure.

The position of a notional subject in one dimension with respect to time of which an image is desired is depicted by line 209 in FIG. 2, and is a stationary target in the dimension being considered in the figure. As mentioned above, motion of a desired subject can be taken into account in order to help interpret the semantics of an image capture situation. For the sake of clarity, the present discussion will be limited to the case that the subject of FIG. 2 is stationary in the dimension depicted in the figure. If the subject were moving in the dimension under consideration, known subject/target tracking techniques could be employed in order to determine a motion pattern of the subject and data relating to this could be generated by a suitable sensor or processor of the camera, and used appropriately, such as, for example in compensating for motion of the subject when determining its desired position within the field of view of the camera, and its final position in a capture image.

The line 211 represents the position or orientation of a camera 100 in one of the six degrees of freedom of the camera with respect to time. Line 211 can represent the position or orientation of an image capture element 101 of a camera 100 with respect to time if it is the motion or orientation of this element of the camera which determines the framing type and accuracy of a captured image.

In the example of FIG. 2, it is assumed that 211 represents motion of the camera 100 in a vertical plane. It will be appreciated that other motions and/or orientations of the camera 100 (and hence the capture element 101) are possible.

In the aiming stage 201, the camera 100 is moved in order to frame a target. In the first stage of the aiming process of FIG. 2, which, broadly speaking, is covered by the period depicted by 213, a user moves the camera upwards with respect to the target in order to frame the target, or adjusts the orientation accordingly. In the particular example depicted by FIG. 2, the target will be substantially desirably framed when the path 211 intercepts 209 as will be explained in further detail below.

Generally in the period depicted by 215 of the aiming stage 201 the user makes adjustments to the camera aim in order to keep the target in the desired portion of the field of view of the camera 100, and/or achieve more desirable framing of the target.

In the steady period 203, the user attempts to keep the camera substantially aligned with the target in order to maintain the desired framing for image capture. It will be noted that at this stage, the camera motion line 211 substantially overlaps the target line 209 and is relatively steady compared to the aiming stage thereby indicating that a desirable framing of the target of which an image is desired has been established.

The deviation in the line 211 in the exposure stage 205 corresponds to a user pressing a button (not shown) on the camera 100 in order to facilitate image capture. Such a button is generally on the top of the camera, and so the line 211 is depicted as moving down in FIG. 2 corresponding to movement of the camera 100 vertically down as the button is pressed. It will be appreciated that such a button may be situated anywhere on a camera 100, and the above is not intended to be limiting. Alternatively, image capture may be initiated by some other means such a voice activated command or some form of biometric signature change (pulse, perspiring, pupil dilation etc) in which case there may be negligible deviation of the camera 100 during the period identified by 205. In general, stage 205 will be present unless the camera being used is one which is continuously capturing a sequence of images such as a video camera for example, in which case, the stage 205 will not be present as indicated in FIG. 2. In that case, the division between the stages of FIG. 2 will be somewhat blurred as a user of a video camera will generally be attempting to constantly maintain a desired accuracy of framing whilst capturing image data.

Stage 207 is the exposure stage in which image data representing the scene or object of interest is generated. In the example of FIG. 2, the position of the camera 100 in the stage 207 (i.e. line 211) has deviated from that of the steady stage 203 as a result of image capture actuation which as mentioned will generally be effected by depressing a suitable button or other such means. In general, the position/orientation of the camera will deviate from that of the steady stage either due to actuation of a button for initiating image capture, or perhaps due to a lack of concentration by a user following stage 205 which may be caused by the user thinking that the capture occurs substantially simultaneously with stage 205. In reality this is generally not the case, and there will be a delay between image capture actuation and image data generation which will vary from device to device. Furthermore, in certain situations, a longer exposure time will be required (e.g. in low light) which can result in further camera movement during stage 207.

Stages 201 and 203 taken together correspond broadly to a "preview" stage of an image capture operation mentioned above, in which a user determines and/or tracks a target and attempts to move/orient the camera in order to frame the target in a desirable way. Desirable framing can depend on the capture conditions and/or the nature of the target.

Data representing at least the patterns of motion and camera control during the preview stage of an image capture operation is generated by the sensor 103, and such data is used in order to classify the framing of a target in a captured image and determine the accuracy of this framing.

According to a preferred embodiment, three elements of an image capture process which results in an image can be addressed using the generated state data: i) framing care, ii) framing accuracy, and iii) framing type.

Framing care can be characterised in terms of how much a user "thought" before framing a target, or how much time a camera aim was finely adjusted before finally capturing the image.

Framing accuracy, which is generally only partly related to care, can be characterised in terms of how likely it is that the framing of a target scene or object that the user wanted was intentional or unintentional. Usually high "care" implies high "precision", but the opposite is not always true.

Framing type can be characterised in terms of whether there is likely to be a subject and a foreground, whether the subject was centred or positioned in the left or right of a captured image, whether it is far away or close, etc. Many of these properties can be determined by analyzing the data relating to the behaviour of the user and their operation of the camera.

So, for example, with reference to FIG. 2, data representing changes in the position/orientation of the camera 100 in the preview period, and the use of any functions of the camera by a user such as a zoom and/or manual focus feature for example, is generated by sensor 103. By analysing this data, the portion/portions of a subsequently captured image which were intended to be framed by the user can be determined as will explained below, and any necessary post capture processing can be applied to the captured image data.

In order to determine the type of framing and the accuracy thereof, the state data generated by the sensor 103 is processed by processor 105 of camera 100. The state data can represent any or all of position and/or orientation changes of the camera 100, the time taken to capture the image 300 (or the time associated with any of the stages of FIG. 1), the time spent focussed on a particular point in space, operation of the camera zoom, and framing an object/scene and then moving away slightly for example. Further useful measures in addition to those listed above are possible as will be appreciated.

Figure 3:
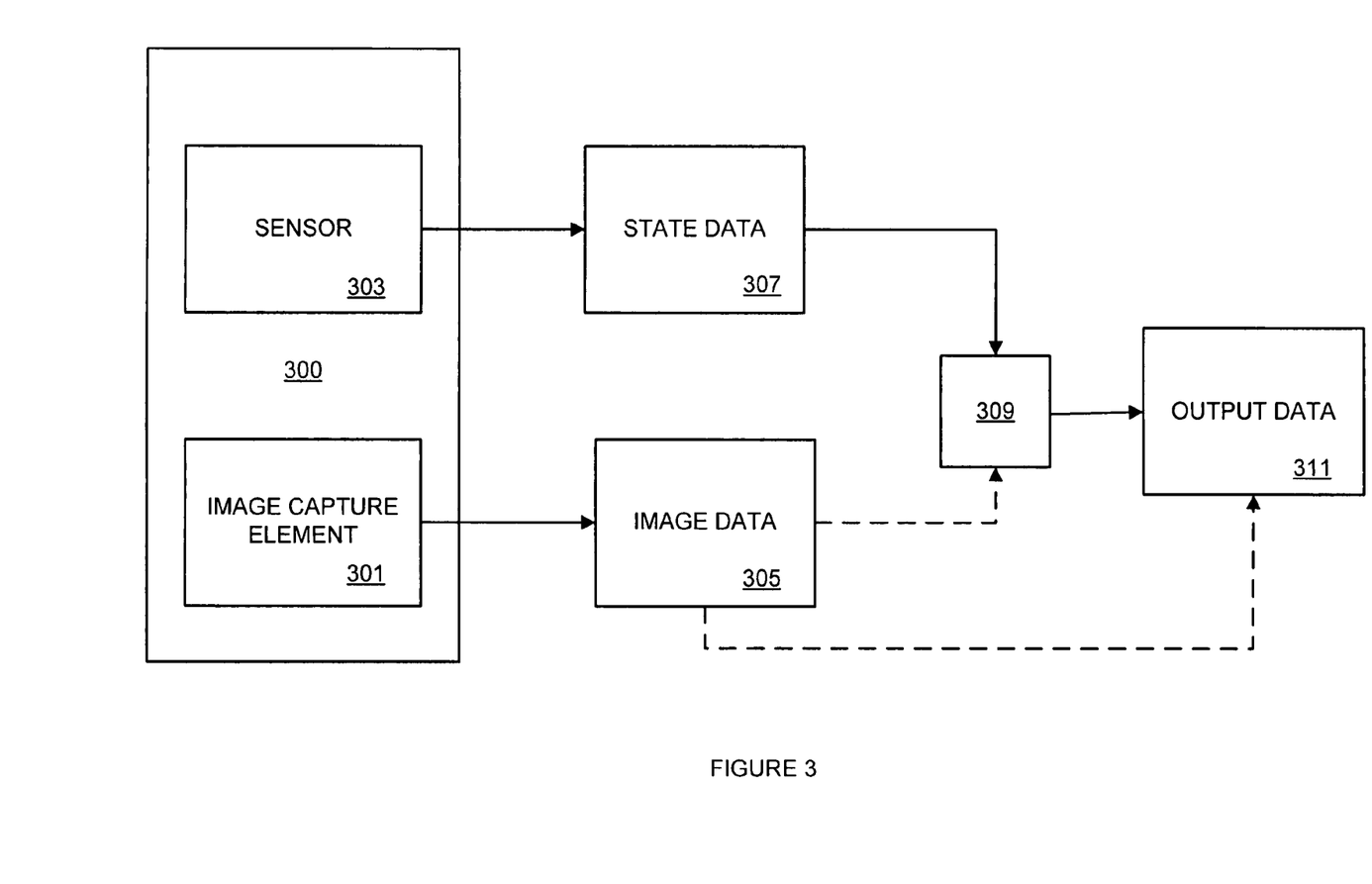
FIG. 3 is a flow diagram representing an exemplary procedure for processing data generated using the camera of FIG. 1 according to an embodiment.

FIG. 3 of the accompanying drawings is a flow diagram representing an exemplary procedure for processing data according to an embodiment.

An image capture device 300 includes an image capture element 301 such as one of the suitable elements mentioned above, and a sensor 303. The element 301 is operable to generate image data 305 representative of a captured image. The sensor is operable to generate state data 307 representative of a condition of device 300 substantially prior to generation of data 305.

The state data 307, and optionally the image data 305 are processed using a suitable processor 309. Processor 309 may be integral to device 300 or remote, in which case the device comprises additional functionality in order to effect transmission of data 305,307 as appropriate using known techniques such as wired or wireless data communications links for example.

Processor 309 is operable to send and receive data from a suitable memory of the device (not shown). Once data 305, 307 as appropriate has been processed, processor 309 generates output data 311. The data 311 can be data representing a use model of the device 300, or can comprise output image data, in which case, processor 309 is operable to process data 305 and data representing a use model of device 300 in order to generate output data 311.

Figure 4:
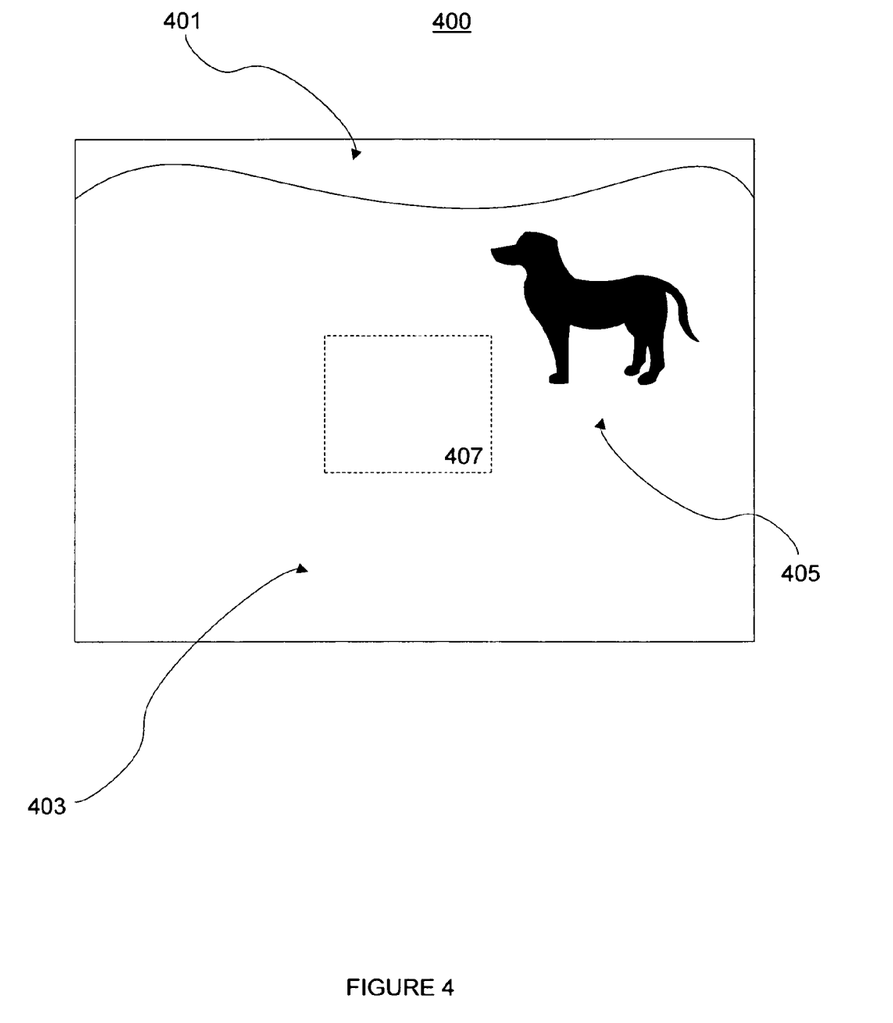
FIG. 4 is a schematic representation of an image captured using the camera of FIG. 1.

The use of state data 307 generated using sensor 103, 301 will now be exemplified with reference to FIG. 4 of the accompanying drawings which is a schematic representation of a captured image 400. The image 400 comprises a background, generally denoted by reference 401, and a foreground 403 which includes an object 405. The object 405 is the desired subject of the image 400, whose motion in one dimension with respect to time can be 209 of FIG. 2.

Motion of the camera 100 in stages 205,207 of FIG. 2 has resulted in the subject 405 being less than optimally framed in a desired portion of the field of view of the camera 100. In this case, the optimality of the framing may be determined from analysis of the steady stage 203. For the purposes of the present example, it can be assumed that when line 211 intercepts a target (209), the target is substantially centrally framed within the field of view of the camera in question, and that this is the framing which was desired by a user of the camera 100. Other alternatives are possible, such that when the lines intercept, a target is framed in another portion of the field of view of the camera 100 for example.

The subject 405 of FIG. 4 is therefore intended to be substantially centrally framed within the field of view of the camera, generally depicted by the dashed box 407. However, with reference to FIG. 4, it is clear that when the image was captured, deviation of the camera has caused the subject 405 to be framed elsewhere, and therefore less than optimally according to the above characterisation.

In order to determine, or at least provide a probability of the framing which was desired, the state data and/or captured image data is analysed by processor 105. In a preferred embodiment, a memory of the camera 100 (not shown) is operable to store data representing a number of use models of the camera. The models may be hidden Markov models for example, or other suitable models, such as probabilistic models for example. State data generated using the sensor 103 is processed in association with the models in order to determine a particular use model of the camera 100 which has resulted in the generation of image data representing a captured image, such as 400 of FIG. 4.

In the case that such use models are represented using hidden Markov models (HMMs), suitable HMMs may be generated in known ways using exemplary data to train the HMMs by marking up image capture behaviours by test subjects, for example. Alternative ways of representing a use model of the camera 100 are possible as will be appreciated by those skilled in the art. For example, various use models can be represented by data in a look-up table or similar (either in hardware or software).

State data generated by the sensor 103 during the preview period as characterised by FIG. 2 and the related description above is used in order to determine a probability that a particular use model has resulted in the generation of image data representing the image 400 of FIG. 4.

Once the probability of a use model has been generated, processor 105 can process image data generated using the image capture element 101 as appropriate in order to compensate for any undesirable framing of the image as a result of the use model which has been determined to be the one with the highest probability.

With reference to FIGS. 1 to 4, the target 405 of an image 400 is determined by processing data from the sensor 103,301 of the camera 100,300 in association with captured image data 305 as necessary. As described, the data 307 represents a condition of the camera 100,300 during the preview period of an image capture operation as characterised by the periods 201,203 of FIG. 2. The subject of the image 400 is determined to be 405. Further, as explained, the state data 307 is also used, in association with a stored model, to determine a particular use model of the camera 100,300 which has resulted in the capture of the image 400.

So, for example, in FIG. 4, and with reference to FIG. 2, the subject 405 of the image 400 is stationary with respect to time in the dimension being considered in FIG. 2, resulting in 209. State data 307 relating to the periods 201,203 of FIG. 2 is processed by processor 103,309 in association with the captured image data 305 representing image 400, and a probability of the likely subject of the image 400 is determined, which is 405 in this case.

Preferably, the state data 307 processed by processor 105, 309 provides an indication of the use model which has the highest probability of being the appropriate use model based on the available state data 307 and optionally with reference to the captured image data 305. The use model with the highest probability is selected by processor 105,309 as that which has resulted in the generation of the image data. Following determination of the use model, the processor 105,309 is operable to determine a measure of the framing type and accuracy thereof, and determine based on this, whether any portions of the captured image should be automatically cropped in order to more clearly frame the subject which was determined as being the desired subject of the captured image. So, for example, in FIG. 4, processing can be applied to the captured image data in order to more clearly frame subject 405. This can be done by cropping regions of the image 400 around subject 405 to provide an output image with subject 405 substantially centrally framed therein.

Stored data representing use models may include that representing a 'quick snap', whereby a user has not taken care to frame the image properly perhaps due to time constraints or through lack of training, or may include the scenario where a user has taken significant time in order to frame a subject in a desired way. It will be appreciated that many other use models of a camera exist, and a suitable learned model may be stored in a memory of the camera 100,300 for each, with the provision of adding to and/or removing such models a function of the camera 100,300 according to a preferred embodiment.

As described above, if the processor 105,309 determines a use model which corresponds to a user having effected care in capturing an image, an automatic image processing step of the camera 100,300 such as autocropping will not be applied to the relevant image. If however, the determined use model suggests that the user has not taken care and/or time for example, then the processor 105,309 is operable to apply an automatic image processing step to the image data 305 such as autocropping thereby generating output image data 311 which better represents that which was intended to be captured by the user, i.e. that in which the subject 405 is framed in a more desirable location of the image 400, and data representing non-salient areas of the image is removed.

Sensor 103,303 can generate data representative of a number of camera properties or changes therein. In addition to changes in camera position and/or orientation, sensor 103, 303 can additionally, or exclusively, generate data represented any one or more of the following: operation of a zoom function of the camera including data relating to a length of time with which the zoom function is operated; directional audio which indicates, perhaps in combination with other features, that the user was framing an animate subject and, in a preferred embodiment, if the framing action matches the direction of the sound it is likely to be highly relevant and well framed; motion in the scene being captured which indicates, perhaps in combination with other features, that the user was framing a moving object or perhaps was waiting for some motion to happen, generally indicated by very steady waiting and a final shooting or motion when an object enters the scene; biometric clues, perhaps in combination with other features, such as heart rate, skin conductivity, pupil dilation, increased rate of breathing, changes in expression etc. Other suitable indications are possible.

All the above points can also be used in order to determine a type of framing, in particular whether the object is centrally framed, or framed in a left or right handed portion of the field of view of the camera. For example, many users might move back and forth from the background to the subject of the image in order to achieve a desired level of exposure. Alternatively, when the user deliberately displaces a subject in a certain portion of the camera field of view, the subject will typically be framed before the user then moves the field of view slightly. This situation typically occurs on cameras which require a "half-depress" of the shutter button to cause auto-exposure and auto-focus on the subject, before moving the camera to re-frame the final image. On such cameras, use of half-depress followed by re-framing is a natural sign of careful composition which can be detected by sensor 103 and used to prevent an autocrop algorithm for example being applied to generated image data.

Alternatively, the camera 100,300 can be arranged to capture an image with a slightly larger field of view than that shown to the user in the viewfinder of the camera or on any other suitable viewer of the camera. In the case of careless or less than optimal composition, an autocrop algorithm can generate a slightly larger field of view than the user selected in the situation where it appears that the edge of a salient region of an image has been unintentionally clipped, or too tightly cropped in the user's framing. Also, in cases where the user has composed the image carefully, the excess pixels as a result of providing the larger field of view can be discarded as required.

In a preferred embodiment, camera 100,300 can provide an indication to a user of the level of confidence of whether an image should be automatically cropped, and by how much it should be cropped. For example, a measure of the level of confidence could be presented to a user a display of the camera 100,300. Such a measure could be displayed as continuous measure, for example a number in a specific range such as from 0 to 10, 0 indicating the lowest level of confidence, 10 indicating the highest level of confidence for example, or alternatively, the measure could be expressed qualitatively using, for example, terms such as "high", "low" etc. Other alternatives are possible.

The present system and method provides the advantage that a camera will not have to estimate quality, type or amount of framing of a subject of an image, but will have objective clues coming from user behaviour which will enable the camera to determine such parameters. Hence, an autocrop function of the camera can be included as a standard part of the image processing, thereby simplifying the user interface and ensuring that images are automatically cropped when appropriate. When the user has carefully framed an image by hand, this is detected automatically, thereby preventing the autocrop algorithm from changing the users carefully considered image. The camera can include an override function whereby any automatic cropping of an image can be undone or prevented, or applied if desired.

A use model may be determined following image capture as described above, or alternatively, 'on the fly' such that an instantaneous measure of the type of use model of the camera 100,300 is substantially continuously generated by processor 105,309 based on available generated state data 307, and optionally using image data registered using the image capture element 101,301 of the camera 100,300. Preferably, state data 307 is generated by sensor 103,303 continuously when the camera 100,300 is powered and in a suitable mode of operation for image or video capture. A specific amount of memory may be allocated for storage of the state data such that old data is overwritten by new for example. The amount of storage can be determined based on considerations including the total amount of memory available in the camera in question, the amount of state data required in order to provide a reliable determination of a use model, and the accuracy of the determination required. Other considerations can be taken into account.

The generation of an instantaneous measure as described above can be effected using state data generated up to the point where the measure is generated.

Such an instantaneous measure can be used in a number of ways. For example, the determined type of framing and accuracy thereof can be presented to a user using a display (not shown) of the camera 100,300. The instantaneous measure can also be used to control image processing before, during and after capture as necessary, so that camera functions such as exposure control and deblurring for example, can be controlled on the basis of the instantaneous measure and/or the type of framing determined after image capture.

In addition to the above, a suitable memory (not shown) of the camera 100,300 can store data representing a specific user of the camera, and a typical use model favoured by that user for example. Such data can be dynamically updated based on the use of the camera 100,300 by the user in question. Furthermore, the memory can store data representing different framing contexts. Such data can be used to determine the deviation from a standard or stored framing behaviour, e.g. an outdoor cycling situation as opposed to portrait situation.

The term "camera" is used above in order to describe implementations of preferred embodiments. It will be appreciated by those skilled in the art however, that this term is not intended to be limiting, and may encompass not only conventional analogue or digital cameras or video-cameras, but also mobile devices such as mobile telephones, PDAs (personal digital assistants) and pagers and the like which have imaging functionality, and generally any mobile image capture device.

The term "framing" and related terms as used above relate to the process of moving/orienting a camera in order that a target, of which an image is desired, is substantially within a desired portion of the field of view of the camera, such as centrally within the field of view of the camera for example.

The approach taken in provides an automated method of generating constraints or hints. By inferring appropriate constraints automatically from the behaviour of the camera user prior to image capture, a user does not have to explicitly interact with an autocrop (or other image processing) algorithm of the camera. In cases where a user has obviously taken considerable care to compose an image carefully, an autocrop algorithm can be completely disabled.

The advantages are that the system will not have to guess on the quality, type or amount of framing, but will have objective clues coming from user behaviour to determine such parameters. An autocrop facility can be safely included as a standard part of the image processing, thereby simplifying the user interface and ensuring that images are cropped when appropriate. When the user has carefully framed an image by hand, this is detected automatically, thereby preventing the autocrop algorithm from changing the users carefully considered image.

The patterns of both motion, time and camera control during a preview stage can be monitored in order to determine the accuracy of the framing, which can be expressed qualitatively (none/low/medium/high/perfect) or with a continuous measurer (e.g. 0-255). The analysis can be done using a learned (probabilistic) model, e.g. Hidden Markov Models, which can be trained by marking up capture behaviours by test subjects. The analysis could be performed by using individual behaviour features extracted independently from raw measurements, sensor or camera controls. One feature could be time to shoot, which indicates, perhaps in combination with other features, a hasty framing as opposed to a careful one. Another feature could be operation of the zoom, which indicates, perhaps in combination with other features, that the user was interested in a particular subject and hence the framing would tend to have been done with high care as well as being precise in this case. Another feature could be the motion of the camera, which pattern indicates, perhaps in combination with other features, whether the user went through the "servoed" phase (see above) or not, indicating that the framing was done with care. Another feature could be length of time over which the zoom was operated, which indicates, perhaps in combination with other features, especially motion, that the user was interested in a particular subject and hence the framing would tend to have been done with high care as well as precision in this case. Another feature could be directional audio, which indicates, perhaps in combination with other features, that the user was framing an animate subject and if the framing action generally matches the direction of the sound it is likely to be highly relevant and well framed. Another feature could be motion in the scene, which indicates, perhaps in combination with other features, that the use was framing a moving object or perhaps was waiting for some motion to happen, indicated by very steady waiting and a final shooting or motion when an object enters the scene. Another feature could be biometric clues, perhaps in combination with other features; for instance it is unlikely that a startled user will have framed an image well.

All the above points can be used to determine also the type of framing, in particular whether the object is central or left and right for example; for instance many users might hop back and forth from the background to the subject in order to find the right exposure etc. Alternatively, when the user deliberately displaces a subject, say to the left, they will typically frame the subject, and then "jump away" slightly and readjust. This situation typically occurs on cameras which require a "half-depress" of the shutter button (image capture actuator) to cause auto-exposure and auto-focus on the subject, before moving the camera to re-frame the final image. On such cameras, use of half-depress followed by re-framing is a natural sign of careful composition which can be detected and used to prevent autocrop (or other image processing).

A camera could be arranged to capture an image with a slightly wider field of view than that shown to the user in the viewfinder. In the case of careless composition, an autocrop algorithm can therefore have the ability to generate a slightly larger field of view than the user selected, in the situation where it appears that the edge of a salient region has been unintentionally clipped, or too tightly cropped in the user's framing. In cases where the user has composed the image carefully, the excess pixels can be discarded.

Using all the above techniques, it is possible to give an indication of confidence of whether, and by how much, to automatically crop a picture. For very accurate framing autocropping is likely to be wrong as the user has taken care in framing.

The above techniques can be used to control any image processing performed after capture, e.g. exposure control deblurring etc. Alternatively, the above techniques can be used to control internal camera settings before exposure.

A status of the framing accuracy and/or type can be indicated to a user of a camera using a suitable display of the camera for example/

Also, a camera can be adapted to recognize a "framing fingerprint" of a particular user, i.e. the way in which a user typically uses the camera. The camera can then automatically process image data on the basis of the fingerprint. A camera can also be adapted to recognize the "framing context" by analyzing any substantial deviation from standard or stored framing behaviours, e.g. an outdoor cycling situation as opposed to a portrait situation where framing is done better.

The invention claimed is:

1. A method of processing image data representing a captured image, the data generated using an image capture element of an image capture device, the method comprising:
   generating state data representing at least one characteristic of motion of the image capture device and a status of at least one setting of the device during a predetermined time period, wherein the predetermined time period is a time period before the image is captured; and
   processing the image data on the basis of the state data in order to provide a measure of the accuracy of framing of the captured image within a field of view of the device.

2. A method as claimed in claim 1, further comprising:
   processing the image data on the basis of the state data in order to provide a measure of the type of framing of the captured image within a field of view of the device.

3. A method as claimed in claim 1, wherein the measure is a qualitative measure.

4. A method as claimed in claim 1, wherein the measure is a quantitative measure.

5. A method as claimed in claim 1, wherein processing the image data includes comparing the state data with data representing at least one model, the or each model representing at least one exemplary motion pattern and/or device setting pattern of the device, and processing the image data on the basis of the comparison.

6. A method as claimed in claim 5, wherein the model data is at least one hidden Markov model.

7. A method as claimed in claim 5, wherein comparing the state data further includes determining a model with the highest probability of representing the characteristic of motion of the image capture device and status of the or each setting of the device during the predetermined period.

8. A method as claimed in claim 1, further comprising generating temporal data representing a time frame over which the image was captured, and processing generated image data on the basis of the temporal data.

9. A method as claimed in claim 1, wherein determining the status of at least one setting of the device includes generating zoom data representing a status of a zoom function of the device during the predetermined time period, and processing the image data on the basis of the zoom data.

10. A method as claimed in claim 1, further comprising:
detecting an audio signal using an audio sensor of the device;
generating directional audio data representing a direction with respect to the audio sensor from which the audio signal was detected; and
processing generated image data on the basis of the directional audio data.

11. A method as claimed in claim 1, further comprising:
determining a subject of an image during the predetermined period;
generating image subject data representing a motion of a subject of the image within a field of view of the device during the period; and
processing the image data on the basis of the image subject data.

12. A method as claimed in claim 1, further comprising:
generating biometric data using at least one biometric sensor of the device, the biometric data representing any one or more of skin conductivity, heart rate, pupil dilation, blood pressure, or perspiration of a user of the device; and
processing the image data on the basis of the biometric data.

13. A method as claimed in claim 1, further comprising:
displaying a measure of the framing type and/or accuracy to a user of the device.

14. A method as claimed in claim 13, wherein the framing data represents whether the subject of the image is framed substantially centrally, or in a left hand, right hand, and/or upper or lower portion of the field of view.

15. A method as claimed in claim 1, wherein determining the status of at least one device setting further comprises:
generating auto-focus data representing whether an image capture actuator of the device, the actuator operable to effect image capture, is in a state causing auto-focus of the device on a desired subject, followed by movement of the device in order to re-frame the desired subject whilst in focus, in the predetermined period; and
processing generated image data on the basis of the auto-focus data.

16. A method as claimed in claim 1, wherein processing the generated image data includes removing a portion of the image.

17. A method as claimed in claim 16, wherein removing a portion of the image comprises:
determining a subset of image data representing a portion of the capture image, the portion including at least a region of the image comprising a desired subject of the image; and
deleting image data outside of the subset from a memory of the device to provide output image data representing a desired image.

18. A method as claimed in claim 1, wherein the image capture element is adapted to generate image data from a larger field of view of the device than that viewable by a user of the device, and wherein processing the image data representing a captured image includes using image data from a portion of the field of view not viewable by a user of the device.

19. A method as claimed in claim 1, further comprising:
alerting the user of the device that the measure of the accuracy of the framing is below a predetermined threshold value.

20. A method as claimed in claim 1, wherein the device is adapted to accept input from a user, the input operable to override processing of the image data.

21. A method as claimed in claim 1, further comprising controlling at least one camera function on the basis of the state data.

22. A method as claimed in claim 8, wherein the temporal data forms part of the state data.

23. An image capture device comprising:
an image capture element operable to generate image data;
a processor; and
a state data generator for generating state data representing at least one characteristic of motion of the image capture device and a status of at least one setting of the device during a predetermined time period, wherein the processor is operable to process image data representing a captured image on the basis of the state data in order to provide a measure of the accuracy of framing of the captured image within a field of view of the device, and wherein the predetermined time period is a time period before the image is captured.

24. A device as claimed in claim 23, further comprising a memory comprising data representing at least one probabilistic model, the or each model representing at least one exemplary motion pattern and/or device setting pattern of the device.

25. A device as claimed in claim 23, further comprising an image capture actuator operable to effect capture of an image, the processor operable to generate auto-focus data representing whether the actuator is in a state causing auto-focus of the device on a desired subject, followed by movement of the device in order to re-frame the desired subject whilst in focus, in the predetermined period, and process generated image data on the basis of the auto-focus data.

26. A device as claimed in claim 23, wherein the device is operable to automatically focus on a subject within a field of view of the device.

27. A device as claimed in claim 23, wherein a user of the device effects focus of the device on a desired subject within a field of view of the device using a focus actuator of the device.

28. A device as claimed in claim 23, wherein the processor is operable to generate data representing a measure of a type of framing of a captured image within a field of view of the device.

29. An image capture device operable in accordance with the method as claimed in claim 1.

30. A non-transitory computer readable medium having stored thereon a computer executable program, the computer executable program when executed causes a computer system to:
generate state data representing at least one characteristic of motion of an image capture device and a status of at least one setting of the device during a predetermined time period; and process image data on the basis of the state data in order to provide a measure of the type and/or accuracy of framing of a captured image within a field of view of the device, wherein the predetermined time period is a time period before the image is captured.

31. A non-transitory computer readable medium having stored thereon a computer executable program, the computer executable program when executed causes a computer system to process image data in accordance with the method claimed in claim 1.

32. A hardware logic circuit configured to operate in accordance with the method claimed in claim 1.

33. A method as claimed in claim 9, wherein the zoom data forms part of the state data.

34. A method as claimed in claim 10, wherein the audio data forms part of the state data.

35. A method as claimed in claim 11, wherein the subject data forms part of the state data.

36. A method as claimed in claim 12, wherein the biometric data forms part of the state data.

37. A method as claimed in claim 14, wherein the framing data forms part of the state data.

38. A method as claimed in claim 15, wherein the autofocus data forms part of the state data.

* * * * *

UNITED STATES PATENT AND TRADEMARK OFFICE
CERTIFICATE OF CORRECTION

| | | |
|---|---|---|
| PATENT NO. | : 9,210,324 B2 | Page 1 of 1 |
| APPLICATION NO. | : 11/253993 | |
| DATED | : December 8, 2015 | |
| INVENTOR(S) | : Pilu et al. | |

It is certified that error appears in the above-identified patent and that said Letters Patent is hereby corrected as shown below:

In the claims

Column 12, line 62, Claim 5, delete "the or" and insert -- the --, therefor.

Column 13, line 4, Claim 7, delete "the or" and insert -- the --, therefor.

Column 14, line 36, Claim 24, delete "the or" and insert -- the --, therefor.

Signed and Sealed this
Twenty-ninth Day of March, 2016

Michelle K. Lee
*Director of the United States Patent and Trademark Office*